United States Patent
Singh et al.

(10) Patent No.: US 6,177,058 B1
(45) Date of Patent: Jan. 23, 2001

(54) HYDROGEN FLUORIDE COMPOSITIONS

(75) Inventors: Rajiv Ratna Singh, Getzville; Harold John Kieta, Buffalo; Matthew Hermes Luly, Lancaster; Jeffrey Warren McKown, East Aurora, all of NY (US); Tadeusz Piotr Rygas, Ontario (CA); Ian Robert Shankland, Williamsville, NY (US)

(73) Assignee: AlliedSignal Inc., Morristown, NJ (US)

( * ) Notice: Under 35 U.S.C. 154(b), the term of this patent shall be extended for 0 days.

This patent is subject to a terminal disclaimer.

(21) Appl. No.: 08/610,816

(22) Filed: Mar. 7, 1996

(51) Int. Cl.$^7$ .................. C01B 7/19; C08J 3/02; B65D 85/84

(52) U.S. Cl. ................ 423/483; 423/484; 423/488; 516/105; 516/106; 516/107; 524/438; 524/462; 206/0.6; 206/0.7; 206/335

(58) Field of Search ................ 423/483, 484, 423/488, 240 R, 648.1; 95/131; 210/670, 679; 516/105, 106, 107; 524/438, 462; 206/0.6, 0.7, 335; 252/315.01

(56) References Cited

U.S. PATENT DOCUMENTS

| | | |
|---|---|---|
| 1,470,772 | 10/1923 | Simon et al. |
| 2,903,345 | 9/1959 | Hedley et al. ............... 41/42 |
| 3,635,836 | 1/1972 | Mullen ................... 252/316 |
| 3,692,581 * | 9/1972 | Ferrara ................... 127/38 |
| 3,927,717 * | 12/1975 | Tate ....................... 166/271 |
| 3,947,558 * | 3/1976 | van Eijl ................. 423/483 |
| 4,004,996 * | 1/1977 | Kollonitsch .......... 204/157.82 |
| 4,079,011 * | 3/1978 | Tate ....................... 507/225 |
| 4,157,376 * | 6/1979 | Vulikh et al. ........... 423/483 |
| 4,297,257 | 10/1981 | Elias et al. ............ 260/29.6 |
| 4,373,050 | 2/1983 | Steinbrecher et al. ...... 524/405 |
| 4,383,868 | 5/1983 | Braley .................... 137/7 |
| 4,466,893 * | 8/1984 | Dill ...................... 507/211 |
| 4,650,527 * | 3/1987 | Ishii et ................. 148/251 |
| 4,807,703 * | 2/1989 | Jennings, Jr. ............ 166/307 |
| 4,923,753 * | 5/1990 | Walles et al. ........ 428/402.24 |
| 4,938,935 | 7/1990 | Audeh et al. ............. 423/240 |
| 4,997,529 * | 3/1991 | Totsuka et al. ........... 205/135 |
| 5,073,363 | 12/1991 | Pellico ................... 424/49 |
| 5,344,504 * | 9/1994 | Deck et al. .............. 148/243 |
| 5,458,674 * | 10/1995 | Barsotti ................. 423/240 S |
| 5,663,474 * | 9/1997 | Pham et al. ............... 585/721 |
| 5,705,717 * | 1/1998 | Puy et al. ................ 570/164 |

FOREIGN PATENT DOCUMENTS

| | | |
|---|---|---|
| WO 95/16740 | 6/1995 | (EP) . |
| 0 679 607 | 11/1995 | (EP) . |
| 1 572 032 | 1/1996 | (GB) . |
| 51-147486 * | 12/1976 | (JP) . |
| 54-006820 | 1/1979 | (JP) . |
| 57-092502 | 6/1982 | (JP) . |
| 2-209795 * | 8/1990 | (JP) . |
| 3-243392 * | 10/1991 | (JP) . |
| 6-264003 * | 9/1994 | (JP) . |
| 2013406 | 5/1994 | (RU) . |
| 665932 * | 6/1979 | (SU) ................... 95/131 |

OTHER PUBLICATIONS

Braley, Gordon K., "Control of Hazardous Material Spills", U.S. Environmental Protection Agency, United States Coast Guard, Vanderbilt University, Louisville, Kentucky, May 13–14, 1980, pp. 1–7.

* cited by examiner

Primary Examiner—Ngoc-Yen Nguyen
(74) Attorney, Agent, or Firm—Colleen D. Szuch; Marie L. Collazo

(57) ABSTRACT

The present invention provides compositions that are intimate mixtures of hydrogen fluoride and a polymer. The compositions of the invention are less hazardous and, therefore, more conveniently stored, transported, and handled in comparison to pure hydrogen fluoride. Further, the hydrogen fluoride may be readily recovered from the compositions of the invention for use.

23 Claims, No Drawings

HYDROGEN FLUORIDE COMPOSITIONS

FIELD OF THE INVENTION

The present invention relates to hydrogen fluoride compositions. More particularly, the present invention provides compositions of hydrogen fluoride and a polymer that are less hazardous and, therefore, more easily stored, transported, and handled in comparison to pure hydrogen fluoride.

BACKGROUND OF THE INVENTION

Hydrogen fluoride is a well known compound that is used in industry in a variety of processes including in alkylation reactions as a catalyst, in fluorination reactions as a fluorinating agent, in the manufacture of fluorides, in the separation of uranium isotopes, and in the production of fluorine containing plastics. It is well known that hydrogen fluoride is a volatile, extremely hazardous substance the high vapor pressure of which renders it readily aerosolizable.

In an attempt to diminish the hazards of hydrogen fluoride, it has been combined with a variety of substances. U.S. Pat. No. 1,470,772 discloses a glass etching paste of mucilage, sulfuric acid, and ammonium fluoride in which the hydrogen fluoride is formed in situ. U.S. Pat. No. 3,635,836 discloses dispersions of hydrogen fluoride, particulate proteinaceous material and a small amount of carboxyl substituted vinyl polymers useful as pickling agents, plumbing cleaners and paint removers. U.S. Pat. No. 4,383,868 discloses a method of treating anhydrous hydrogen fluoride spills by applying a particulate mixture of polyacrylamide and a polyalkyl(alk)acrylate to the surface of the spill. None of these compositions provides an intimate mixture of hydrogen fluoride and a substance that both reduces the hazards of hydrogen fluoride and, at the same time, permits the ready recovery of the hydrogen fluoride from the composition.

DESCRIPTION OF THE INVENTION AND THE PREFERRED EMBODIMENTS

The present invention provides liquid and solid hydrogen fluoride compositions that are a convenient means of using, transporting, and storing hydrogen fluoride, the compositions being less hazardous than pure hydrogen fluoride. Further, the chemical properties of the hydrogen fluoride in the compositions of the present invention are substantially unchanged from those of hydrogen fluoride in its pure state and hydrogen fluoride may be quantitatively recovered from the compositions.

The compositions of the invention comprise intimate mixtures of hydrogen fluoride and an effective amount of a water-soluble polymer. The term polymer, for purposes of this invention, includes homopolymers, copolymers, and mixtures thereof. It has been discovered that certain polymers in intimate mixture with hydrogen fluoride provide a composition in which hydrogen fluoride volatility is diminished. Additionally, the compositions of the invention are more viscous and have a greater surface tension when compared to pure hydrogen fluoride, hindering formation of a hydrogen fluoride aerosol cloud.

Generally, the polymers used in the invention have molecular weights of from about 5,000 to about 10,000,000. Preferably, polymers with molecular weights of from about 5,000 to about 1,000,000 are used. The polymers useful in the compositions of the invention are water-soluble polymers. By "water-soluble polymer" is meant any high molecular weight compound that swells, to about twice its dry volume, or dissolves with the addition of water at room temperature.

Water-soluble polymer is meant to include semi-synthetic water-soluble polymers, synthetic water-soluble polymers, and mixtures thereof. Semi-synthetic water-soluble polymers are natural water-soluble polymer derivatives. Synthetic water-soluble polymers are not natural water-soluble polymer derivatives and are formed only through chemical reactions.

Exemplary semi-synthetic water-soluble polymers include, without limitation, cellulose ethers, modified starches, starch derivatives, natural gum derivatives, and mixtures thereof Illustrative synthetic water-soluble polymers include, without limitation, polymers, related polymers, and polymer salts of acrylamide, acrylic acid, ethylene oxide, methacrylic acid, polyethyleneimine, polyvinyl alcohol, polyvinyl pyrrolidone, and mixtures thereof. By related polymer is meant that the polymer repeat unit, or a branch thereof, is extended by carbon atoms, preferably from one to four carbon atoms. For example, a related polymer of acrylic acid is one in which the vinyl group is extended by one carbon to form an allyl group.

Preferably, a synthetic water-soluble polymer is used. More preferably, polyacrylic acid or one of its salts is used. Most preferably, the water-soluble polymer is sodium polyacrylate.

To prepare the compositions of the invention, an effective amount of a water-soluble polymer is mixed with hydrogen fluoride in any suitable corrosion resistant vessel to form an intimate mixture. An effective amount of polymer is an amount capable of decreasing the volatility and increasing the surface tension of the hydrogen fluoride to the level desired for the end use. Addition of the polymer and hydrogen fluoride may be performed in any sequence. Mixing may be accomplished by any means convenient, including without limitation stirring or dispersing the polymer into a pool of hydrogen fluoride or passing hydrogen fluoride gas over the polymer. The hydrogen fluoride may be commercially available anhydrous hydrogen fluoride having a water content of 0.1% or less or aqueous hydrogen fluoride. Preferably, anhydrous hydrogen fluoride is used. The polymer may be in any form suitable for mixing with the hydrogen fluoride including, without limitation, granules, beads, pellets, fibers, or mats. Mixing will occur faster for smaller particle sizes of the polymer and slower for larger sizes. Typically mixing is performed at temperatures from about 0 to about 100° C., preferably from about 10 to about 40° C. Pressure is not critical.

The amount of hydrogen fluoride and polymer used will depend in part on the polymer selected and the desired end-use for the composition. If the polymer has a relatively low molecular weight, the resulting HF/polymer composition will be a viscous liquid. If the polymer has a relatively high molecular weight, the resulting composition will be a solid or gel-like solid. Additionally, the amount of polymer used will determine whether or not the resulting composition is a solid or liquid. Generally, when up to about 20 percent by weight, based on the total weight of the composition, of polymer is used the composition will be a viscous liquid. Compositions in which the amount of polymer is at least about 25 weight percent, generally, will take a gel-like solid form.

It should be noted further that the higher the weight percentage of polymer used, the greater the reduction in hydrogen fluoride aerosolization. However, with an increase in weight percentage of polymer, the weight percentage of hydrogen fluoride in the composition decreases which may affect the composition's suitability for a desired end-use. Therefore, the effective amount of hydrogen fluoride and polymer used will depend on a consideration of a number of factors. Generally, from about 2 to about 99.9 weight percent of polymer and from about 98 to about 0.1 weight percent of hydrogen fluoride is used. Preferably, from about 2 to about 50 weight percent polymer and from about 98 to about 50 weight percent hydrogen fluoride, more preferably from about 5 to about 25 weight percent of polymer and from about 95 to about 75 weight percent of hydrogen fluoride is used.

Without departing from the scope of the invention, it will be recognized that other components may be included in the compositions of this invention. The specific nature of these components will depend on the desired end use of the compositions. In general, any component that does not deleteriously effect the surface tension of the composition, or undesirably increase the volatility of the hydrogen fluoride component, may be used.

The hydrogen fluoride may be recovered readily from the composition of the invention by treating the composition so as to liberate hydrogen fluoride vapors. One means of treating the compositions in order to liberate hydrogen fluoride vapor is by heating the composition at elevated temperatures, generally from about 0 to about 200° C., preferably from about 80 to about 150° C., resulting in the liberation of hydrogen fluoride vapor. The vapor may then be condensed by any convenient means. Alternatively, the hydrogen fluoride may be liberated by decreasing the pressure over the composition or increasing both the pressure and temperature and then condensing the vapors. This alternative means for recovering hydrogen fluoride may be accomplished at pressures of from about 60 to about 1 psia and temperatures of from about 20 to about 50° C. As yet another alternative, hydrogen fluoride value may be recovered from the compositions by use of the compositions in any of the wide variety of processes that use hydrogen fluoride.

The compositions of the invention provide a convenient and safe method for storing hydrogen fluoride. Because the compositions exhibit little or no volatilization of hydrogen fluoride, the hazards of storing the hydrogen fluoride are significantly reduced. Further, the hydrogen fluoride may be recovered from the stored composition by the means described herein. Additionally, the stored material may be safely transported.

The compositions of the invention may be prepared and then placed in a storage container by any convenient means. Alternatively, the compositions may be prepared in the storage container. Suitable storage containers are those containers made of, or lined with, a hydrogen fluoride resistant material such as carbon steel, polymers, MONEL™, and the like. Storage of the compositions may be for any length of time provided that the compositions are not exposed to air or other chemicals. Preferably, storage is under ambient conditions.

The stored composition may be safely and efficiently transported to a destination. Transporting of the composition may be by any conventional means such as by rail car or truck. Once delivered to the destination, the stored composition may be treated to recover the hydrogen fluoride from the composition for use.

The invention will be clarified further by a consideration of the following examples that are intended to be purely exemplary.

EXAMPLES

Example 1

7 g sodium polyacrylate, m. wt. 1,000,000, were weighed in a perfluoroalkoxy ("PFA") cylinder into which 28 g anhydrous hydrogen fluoride were charged. At ambient temperature, the mixture turned into a viscous solid with a gel-like consistency. The PFA cylinder containing the mixture was heated to 90° C. liberating HF vapors and the HF collected into another cooled cylinder. Essentially all of the HF was recovered.

Example 2

The procedure of Example 1 was repeated 15 times with the same sample of sodium polyacrylate. Essentially all of the HF was recovered each time.

Example 3

The procedure of Example 1 was used except that 7 g polyacrylamide, m. wt. 100,000, were substituted for the sodium polyacrylate of Example 1. Recovery of HF was 70% from the gel-like viscous solid.

Example 4

The procedure of Example 1 was used except that 7 g polyacrylic acid, m. wt. 1,250,000, were substituted for the sodium polyacrylate of Example 1. Essentially all of the HF was recovered from the gel-like viscous solid.

Example 5

The procedure of Example 1 was used except that 5 g polyacrylic acid, m. wt. 250,000, were substituted for the sodium polyacrylate of Example 1. The resultant mixture was a viscous liquid from which essentially all of the HF was recovered.

Example 6

The procedure of Example 1 was used except that 7 g sodium salt of polyacrylic acid copolymerized with 50 wt percent maleic acid, 50,000 m. wt. available from Aldrich Chemical Co. were substituted for the sodium polyacrylate of Example 1. The resultant mixture was a viscous liquid from which essentially all of the HF was recovered.

Example 7

The procedure of Example 1 was used except that 2 g sodium polyacrylate copolymerized with 20 wt percent, 50,000 m. wt. acrylamide available from Aldrich Chemical Co. were substituted for the sodium polyacrylate of Example 1. The resultant mixture was a viscous liquid from which essentially all of the HF was recovered.

Example 8

The procedure of Example 1 was used except that 7 g acrylic acid copolymerized with 10 wt percent, 200,000 m. wt. acrylamide available from Aldrich Chemical Co. were substituted for the sodium polyacrylate of Example 1. The resultant mixture was a viscous liquid from which essentially all of the HF was recovered.

Example 9

The procedure of Example 1 was used except that 2,100 m. wt. sodium polyacrylate was substituted for the sodium polyacrylate of Example 1. The resultant mixture was a viscous liquid from which essentially all of the HF was recovered.

Example 10

The procedure of Example 1 was used except that sodium acrylate copolymerized with 10 wt percent, 15,000 m.wt. methylmethacrylate available from Aldrich Chemical Co. was substituted for the sodium polyacrylate of Example 1. The resultant mixture was a viscous liquid from which essentially all of the HF was recovered.

Example 11

7 g sodium polyacrylate, 1,000,000 m. wt., were weighed in a PFA cylinder into which 30 g of a 40:60 percent by weight HF and water mixture were charged. The mixture turned into a gel-like viscous solid. The PFA cylinder containing the mixture was heated to 120° C. liberating HF and water vapors and the aqueous HF collected into another cooled cylinder. Essentially all of the HF and water were recovered.

Example 12

The vapor pressures of a number of HF/sodium polyacrylate mixtures were measured. For each example, weighed amounts of the polymer and BF were mixed together in a MONEL™ cylinder and the cylinder was repeatedly degassed by freeze and thaw cycles for approximately 4 cycles. The cylinder was placed in a temperature regulated bath and a pressure gauge with a range of 0 to 1000 mm Hg was connected to the cylinder. The vapor pressures were read from the gauge at various bath temperatures and the results are shown on Table 1. The vapor pressures of the mixtures were found to be lower than that of pure HF.

TABLE 1

| HF wt percent | VP at 25° C. | VP at 50° C. | VP at 75° C. | VP at 100° C. |
| --- | --- | --- | --- | --- |
| 40 | 31 | 143 | 408 | 933 |
| 60 | 436 | 626 | 1003 | over range |
| 70 | 502 | over range | over range | over range |
| 80 | 631 | over range | over range | over range |
| 100* | 914 | 2049 | 4146 | 7743 |

*Literature value.

Example 13

The surface tensions of several HF/polymer mixtures were measured using a DuNouy interfacial tensiometer. In this method, a platinum ring was drawn upwardly through the mixture. The force needed to lift the ring off of the liquid surface was measured by the tensiometer and is proportional to the surface tension of the liquid. The results obtained at 15° C. are shown on Table 2. The HF/polymer mixtures' tensions were found to be higher than that of pure HF which is 8.6 dyne/cm.

TABLE 2

| Polymer | Wt % Polymer | Surface Tension (dyne/cm) |
| --- | --- | --- |
| Example 1 | 10.5 | 19.3 |
| Example 4 | 10.0 | 13.4 |
| Example 7 | 9.8 | 17.1 |

TABLE 2-continued

| Polymer | Wt % Polymer | Surface Tension (dyne/cm) |
| --- | --- | --- |
| Example 8 | 10.0 | 15.2 |

Example 14

A mixture of 30 wt percent sodium polyacrylate and 70 wt percent HF is prepared as in Example 1 and the mixture is stored in a vessel equipped with a valve. The mixture formed is a solid as in Example 1. The mixture is stored at room temperature for a week with no apparent visual changes. After that time, the valve is opened to vent for 1 minute at ambient temperature and pressure. The amount of HF vented to atmosphere is determined by the difference in weight before and after venting. The fraction of HlF vented is determined to be significantly less than the HF that would be vented from a vessel of 100% HF under identical conditions.

Example 15

A mixture of 30 wt percent sodium polyacrylate and 70 wt percent HF is prepared as in Example 1 and stirred in a valved vessel. The mixture is a solid as in Example 1. The vessel containing the mixture is packed in an appropriate container and transported over a distance. The vessel containing the HF/polymer mixture is unpacked and heated and the HF collected as in Example 1.

Example 16

The procedure of Example 1 is repeated except that 1 g polyethylene oxide, m. wt. 10,000,000 and 19 g HF are substituted for the sodium polyacrylate and HF of Example 1.

Example 17

The procedure of Example 1 is repeated except that 7 g poly(methacrylic acid), m. wt. 2,500,000 and 13 g HF are substituted for the sodium polyacrylate and HF of Example 1.

Example 18

The procedure of Example 1 is repeated except that 17 g polymethacrylamide, m. wt. 250,000 and 3 g HF are substituted for the sodium polyacrylate and HF of Example 1.

Example 19

The procedure of Example 1 is repeated except that 50 g polyvinyl alcohol, m. wt. 500,000 and 1 g HF are substituted for the sodium polyacrylate and HF of Example 1.

Example 20

The procedure of Example 1 is repeated except that 5 g polyvinyl pyrrolidone, m. wt. 50,000 and 15 g HF are substituted for the sodium polyacrylate and HF of Example 1.

Example 21

The procedure of Example 1 is repeated except that 5 g polyethyleneimine, m. wt. 750,000 and 15 g HF are substituted for the sodium polyacrylate and HF of Example 1.

What is claimed is:

1. A composition consisting of anhydrous hydrogen fluoride and a water soluble polymer selected from the group consisting of cellulose ethers, modified starches, starch derivatives, natural gum derivatives, polyacrylic acid salts, ethylene oxide polymer, methacrylic acid polymer, polyethyleneimine polymer, polyvinyl pyrrolidone polymer and mixtures thereof, wherein the composition is in the form of a solid or a gel.

2. The composition of claim 1 wherein the polyacrylic acid salt is sodium polyacrylate.

3. The composition of claim 1 wherein the amount of water-soluble polymer is from about 2 to about 50 weight percent based on the total weight of the composition.

4. The composition of claim 1 wherein the amount of water-soluble polymer is from about 5 to about 25 weight percent based on the total weight of the composition.

5. The composition of claim 1 wherein the polymer has a molecular weight of from about 5,000 to about 1,000,000.

6. The composition of claim 2 wherein the sodium polyacrylate is present in an amount of from about 2 to about 50 weight percent based on the total weight of the composition and has a molecular weight of from about 5,000 to about 1,000,000.

7. The composition of claim 6 wherein the sodium polyacrylate is present in an amount of from about 5 to about 25 weight percent based on the total weight of the composition.

8. The composition of claim 1 wherein the water-soluble polymer consists of a polyacrylic acid salt.

9. The composition of claim 1 wherein the water-soluble polymer consists of an ethylene oxide polymer.

10. The composition of claim 1 wherein the water-soluble polymer consists of a methacrylic acid polymer.

11. The composition of claim 1 wherein the water-soluble polymer consists of a polyethyleneimine polymer.

12. The composition of claim 1 wherein the water-soluble polymer consists of a polyvinyl pyrrolidone polymer.

13. The composition of claim 1 wherein the water-soluble polymer consists of a cellulose ethers.

14. The composition of claim 1 wherein the water-soluble polymer consists of a modified starch.

15. The composition of claim 1 wherein the water-soluble polymer consists of a starch derivative.

16. The composition of claim 1 wherein the water-soluble polymer consists of a natural gum derivative.

17. The composition of claim 1 wherein the water-soluble polymer consists of a mixture of more than one water-soluble polymer selected from the group consisting of cellulose ethers, modified starches, starch derivatives, natural gum derivatives, polyacrylic acid salts, ethylene oxide polymer, methacrylic acid polymer, polyethyleneimine polymer, polyvinyl pyrrolidone polymer.

18. A method of storing hydrogen fluoride comprising the steps of:
(a) preparing a composition consisting of anhydrous hydrogen fluoride and a water soluble polymer selected from the group consisting of cellulose ethers, modified starches, starch derivatives, natural gum derivatives, polyacrylic acid salts, ethylene oxide polymer, methacrylic acid polymer, polyethylenimine polymer, polyvinyl pyrrolidone polymer and mixtures thereof, wherein the composition is in the form of a solid or a gel; and
(b) storing the intimate mixture in a storage container.

19. A method of recovering hydrogen fluoride from a composition consisting of anhydrous hydrogen fluoride and a water soluble polymer selected from the group consisting of cellulose ethers, modified starches, starch derivatives, natural gum derivatives, polyacrylic acid salts, ethylene oxide polymer, methacrylic acid polymer, polyethylenimine polymer, polyvinyl pyrrolidone polymer and mixtures thereof, wherein the composition is in the form of a solid or a gel, the process comprising the steps of (i) treating the composition so as to liberate a hydrogen fluoride vapor and (ii) condensing the liberated hydrogen fluoride vapor.

20. The method of claim 19 wherein the composition is treated by heating.

21. The method of claim 19 wherein the composition is treated by decreasing the pressure over the mixture.

22. The method of claim 19 wherein the composition is treated by simultaneously heating the composition and increasing the pressure over the composition.

23. A method for transporting hydrogen fluoride comprising the steps of:
(a) preparing a composition consisting of anhydrous hydrogen fluoride and a water soluble polymer selected from the group consisting of cellulose ethers, modified starch derivatives, natural gum derivatives, polyacrylic acid salts, ethylene oxide polymer, methacrylic acid polymer, polyethylenimine polymer, polyvinyl pyrrolidone polymer and mixtures thereof, wherein the composition is in the form of a solid or a gel;
(b) storing the composition in a storage container; and
(c) transporting the storage container to a destination.

* * * * *